US006869654B2

(12) United States Patent
Ginkel et al.

(10) Patent No.: US 6,869,654 B2
(45) Date of Patent: Mar. 22, 2005

(54) METHOD OF MAKING PRINTABLE FORMS COMPRISING STICKERS AND ARTICLES

(75) Inventors: Scott T. Ginkel, Stillwater, MN (US); R. Ellen Harelstad, Woodbury, MN (US); Sundar J. Rajan, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/293,037

(22) Filed: Nov. 13, 2002

(65) Prior Publication Data

US 2004/0091657 A1 May 13, 2004

(51) Int. Cl.[7] .................................................. B32B 3/00

(52) U.S. Cl. .......................... 428/40.1; 156/292; 281/2; 281/5; 283/81; 283/904; 428/41.8; 428/41.9; 428/42.1; 428/42.2; 428/42.3; 428/192; 428/194

(58) Field of Search ............................... 428/40.1, 41.8, 428/41.9, 42.1, 42.2, 42.3, 192, 194, 43; 283/81, 904; 281/2, 5; 156/292

(56) References Cited

U.S. PATENT DOCUMENTS

| | | | | |
|---|---|---|---|---|
| 4,379,573 A | | 4/1983 | Lomeli et al. | |
| 5,007,663 A | * | 4/1991 | Moran | 283/81 |
| 5,330,232 A | | 7/1994 | Smith | |
| 5,344,705 A | | 9/1994 | Olsen | |
| 5,466,502 A | * | 11/1995 | Wilkinson | 428/40 |
| 5,601,682 A | | 2/1997 | Longtin | |
| 5,756,175 A | | 5/1998 | Washburn | |
| 5,788,796 A | | 8/1998 | Look et al. | |
| 6,027,014 A | | 2/2000 | Cochran | |
| 6,092,843 A | | 7/2000 | Peterson et al. | |
| 6,149,204 A | | 11/2000 | Casper | |
| 6,303,202 B1 | | 10/2001 | Washburn et al. | |
| 6,361,078 B1 | * | 3/2002 | Chess | 283/81 |
| 6,406,787 B1 | | 6/2002 | Rajan et al. | |
| 6,409,871 B1 | | 6/2002 | Washburn et al. | |
| 6,471,817 B1 | | 10/2002 | Emmert | |

FOREIGN PATENT DOCUMENTS

| | | |
|---|---|---|
| EP | 1 033 316 | 6/2000 |
| WO | WO 01/14150 | 1/2001 |

* cited by examiner

*Primary Examiner*—Nasser Ahmad
(74) *Attorney, Agent, or Firm*—Carolyn A. Fischer

(57) ABSTRACT

The invention discloses form constructions and methods of making form constructions comprising a substrate having a printable surface portion and a sticker. In preferred embodiment the sticker is a face adhering validation sticker and/or the form substrate comprises a cutout with the viewing surface of the sticker releasably attached to the perimeter of the cutout and exposed through the cutout.

24 Claims, 5 Drawing Sheets

METHOD OF MAKING PRINTABLE FORMS COMPRISING STICKERS AND ARTICLES

FIELD OF THE INVENTION

The invention discloses form constructions and methods of making form constructions comprising a substrate having a printable surface portion and a sticker. In preferred embodiment the sticker is a face adhering validation sticker and/or the form substrate comprises a cutout with the viewing surface of the sticker releasably attached to the perimeter of the cutout and exposed through the cutout.

BACKGROUND OF THE INVENTION

Validation stickers are used as proof of registration of automobiles and other motor vehicles (e.g. trucks, snowmobiles, etc.) These retroreflective stickers generally have a printable plastic top surface and a pressure sensitive adhesive (PSA) on the bottom with a protective liner that is removed before it is adhered to the ultimate surface such as an automobile license plate. Such stickers usually have printed variable information. The end user (e.g. vehicle owner) typically also gets a card with his/her name, address, amount paid, etc., at the time the fees are paid to the issuing agency. Issuing agencies prefer to print these stickers and cards at the same time and on demand as needed. In order to do so, it is common to pre-attach stickers with the liners to cards via an additional layer of adhesive between the liner and the card surface prior to the printing operation. Problems twith this approach were addressed in U.S. Pat. No. 6,406,787, such patent relating to a form sheet having a digital printable surface portion and a release surface portion, on which release coating surface portion a signage with a pressure-sensitive adhesive can be releasable adhered.

In contrast to validation stickers wherein the opposing surface of the sticker is bonded to a target surface, i.e. license plate, other types of vehicle registration stickers such as parking permits and park passes employ face adhering verification ("FAV") wherein the viewing surface of the sticker rather than the opposing surface comprises a pressure sensitive adhesive covered with a release liner. During use the release liner is removed and the sticker adhered to, for example, the interior of a windshield, the sticker intended to be viewed from the outside.

An exemplary decal assembly and method of making a FAV sticker is described in U.S. Pat. No. 5,788,796 (Look et al). As described in the abstract of U.S. Pat. No. 5,788,796, the decal assembly comprises a backing web, a printed label (e.g. sticker) positioned on the backing web, an adhesive web applied over the label and the backing web, and a releasable liner web carrying the adhesive web and applied over the label and the backing web. The label and the adhesive web over the label define the actual decal. In a preferred embodiment the label is made from retroreflective sheeting. Labels printed with fixed information are provided on a master roll. The endmost label is printed with variable information, separated from the master roll, and then assembled into the decal assembly. For use, the releasable web is peeled back to reveal the adhesive web, the label, and the backing web. The decal (i.e. the label and the adhesive web covering the label) can then be separated from the surrounding adhesive web and the backing web and applied to a surface.

The form construction depicted in FIGS. 1 and 2 has been commercially available from 3M Company (3M), St. Paul, Minn. This form construction was manufactured by providing an 11 inch (28 cm) wide roll of paper and a 3.5 inch (8.9 cm) wide roll of retroreflective sheeting, removing the release liner from the non-viewing surface of the sheeting to expose the underlying pressure sensitive adhesive, contacting the adhesive to the paper near an edge of the roll of paper, contacting the adhesive coated surface of a 3.5 inch (8.9 cm) wide roll of transfer tape having window-like openings spaced apart 8.5 inches (22 cm) on center to the viewing surface of the sheeting, die cutting from the backside a 0.5 inch (1.3 cm) frame around the perimeter of each such window-like opening forming a sticker, and cutting the roll into sheets such that each sticker is positioned approximately in the center of each sheet as depicted in FIGS. 1 and 2. The paper form and the exposed center portion of the sticker are digitally printed by an issuing agency. The end user removes the sticker 80 from the paper 60. In doing so, the release liner 70 of the transfer tape remains attached to the form exposing the adhesive on the viewing surface beneath the release liner. The end user then contacts the exposed adhesive to the inside of a motor vehicle windshield.

It has been discovered that when the retroreflective sheeting extends to the peripheral parallel edges of a paper form construction, the paper tends to curl once the roll has been cut into an individual sheet, as depicted in FIG. 2. The curled sheets tend to jam and/or miss-print when printed by the issuing agency. Additional problems occur with this construction during folding and packaging as the extra thickness of the sheeting at the edges of the form sheet often cause the equipment to stop since the equipment sensors mistakenly detect multiple sheets being processed.

Accordingly, industry would find advantage in improved form constructions comprising stickers and improved methods of making such form construction.

SUMMARY OF THE INVENTION

The present invention discloses a form construction comprising a substrate having a printable surface portion and a sticker having a viewing surface and an opposing surface. The viewing surface comprises a pressure sensitive adhesive covered with a release liner and the opposing surface comprises a pressure sensitive adhesive bonded to the substrate. The sticker and the substrate have uncommon parallel peripheral edges.

In another embodiment, the form construction comprises a porous substrate bonded to the opposing surface of the sticker and the porous substrate is exposed on the opposing surface of the sticker.

In another embodiment, the form construction comprises a substrate having a cutout and the viewing surface of the sticker is temporarily adhered to the perimeter of the cutout and exposed through the cutout. The perimeter of the cutout may optionally comprise a release coating and/or the viewing surface of the sticker may comprise a removable adhesive.

In another aspect, the invention discloses a method of making a form construction comprising providing a sticker having adhesive on both surfaces and bonding the sticker to a form substrate.

In each of the embodied articles and methods, the sticker is preferably positioned in a center portion of the substrate. Further, the pressure sensitive adhesive covered with the release liner on the viewing surface of the sticker alone or in combination with the form substrate of the sticker has a peripheral edge that is substantially the same as the sticker. In addition, the sticker preferably comprises at least one tab comprising the release liner. The sticker preferably has an exposed viewing surface portion that is (e.g. digital) printable. The sticker preferably comprises a polymeric film that may be retroreflective. Preferred stickers include vehicle registration stickers, validation stickers, parking permit stickers, and park permit stickers. Further, the sticker preferably comprises at least one tamper-indicating feature.

DETAILED DESCRIPTION OF THE PREFERRED EMBODIMENTS

The present invention is directed to form construction articles comprising a sticker and methods of making form constructions having stickers. As used herein, "sticker" refers to a substrate that has a length and width smaller than the form substrate and comprises a pressure sensitive adhesive on at least one face.

FIGS. 3–7 depict various embodiments of the present invention comprising a form construction comprising a form substrate 10 (e.g. paper) and a FAV sticker 20.

Figure 3:
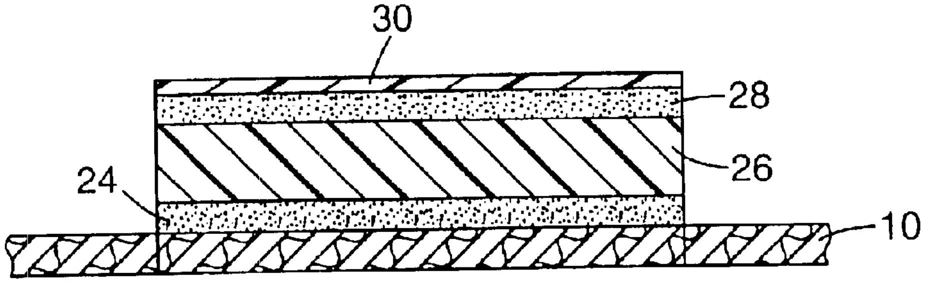
FIGS. 3–6 depict form constructions comprising FAV stickers in accordance with the present invention.
Figure 4:
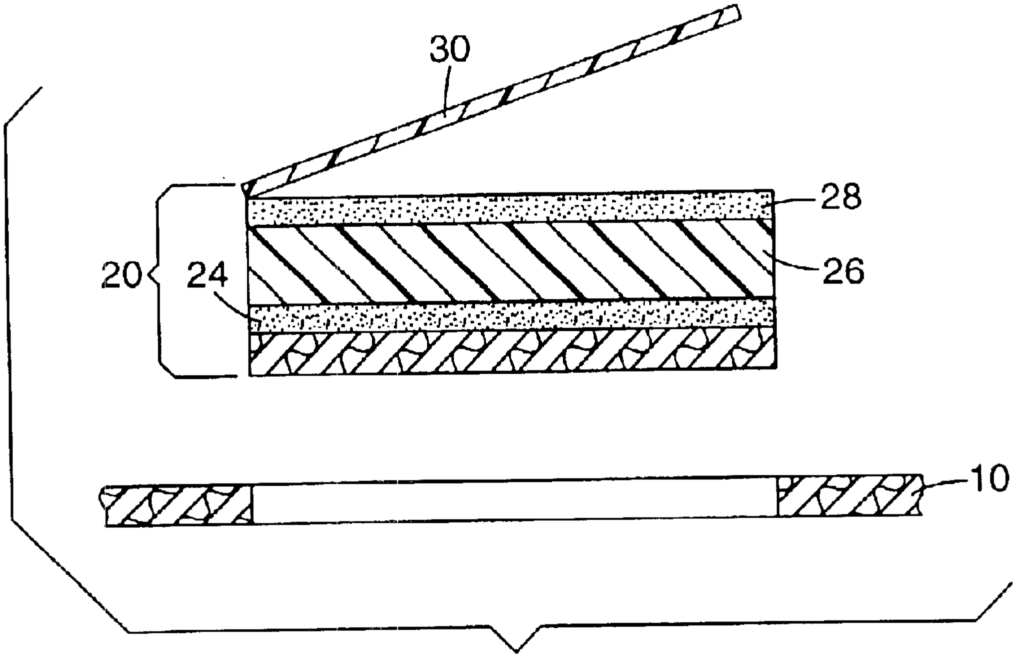

Referring now to FIGS. 3–4 depicting cross-sectional views of the form construction, sticker 20 comprises a continuous or discontinuous layer of pressure sensitive adhesive 28 on the viewing surface covered by release liner 30. Although the "sticker substrate" 26 may comprise materials such as paper, the sticker substrate is preferable durable material. Preferred durable materials include various polymeric films that may be opaque, transparent, translucent, reflective or retroreflective. In this preferred embodiment, the sticker is bonded to the form substrate 10 with a pressure sensitive adhesive (PSA) composition 24.

Figure 5:
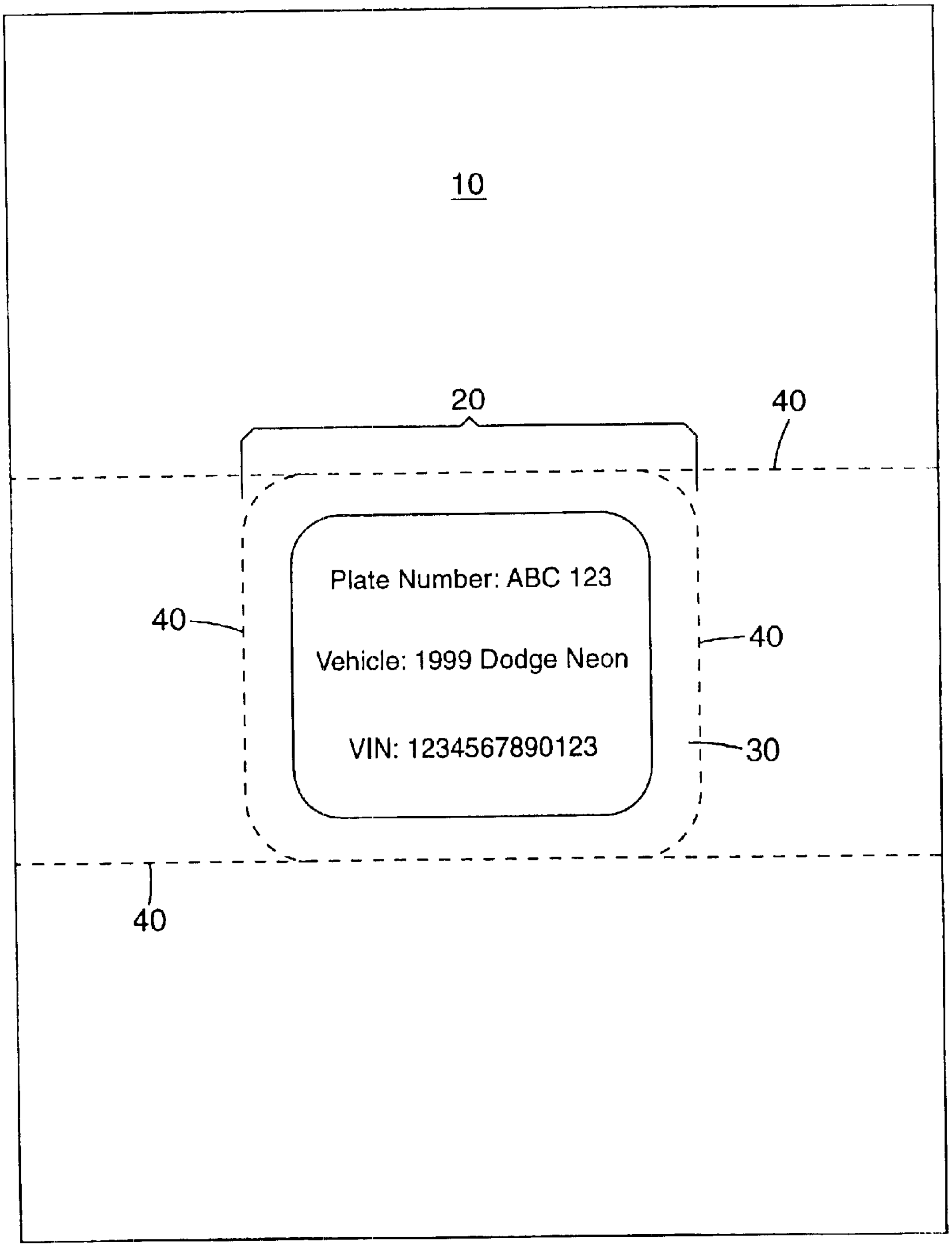
Figure 6:
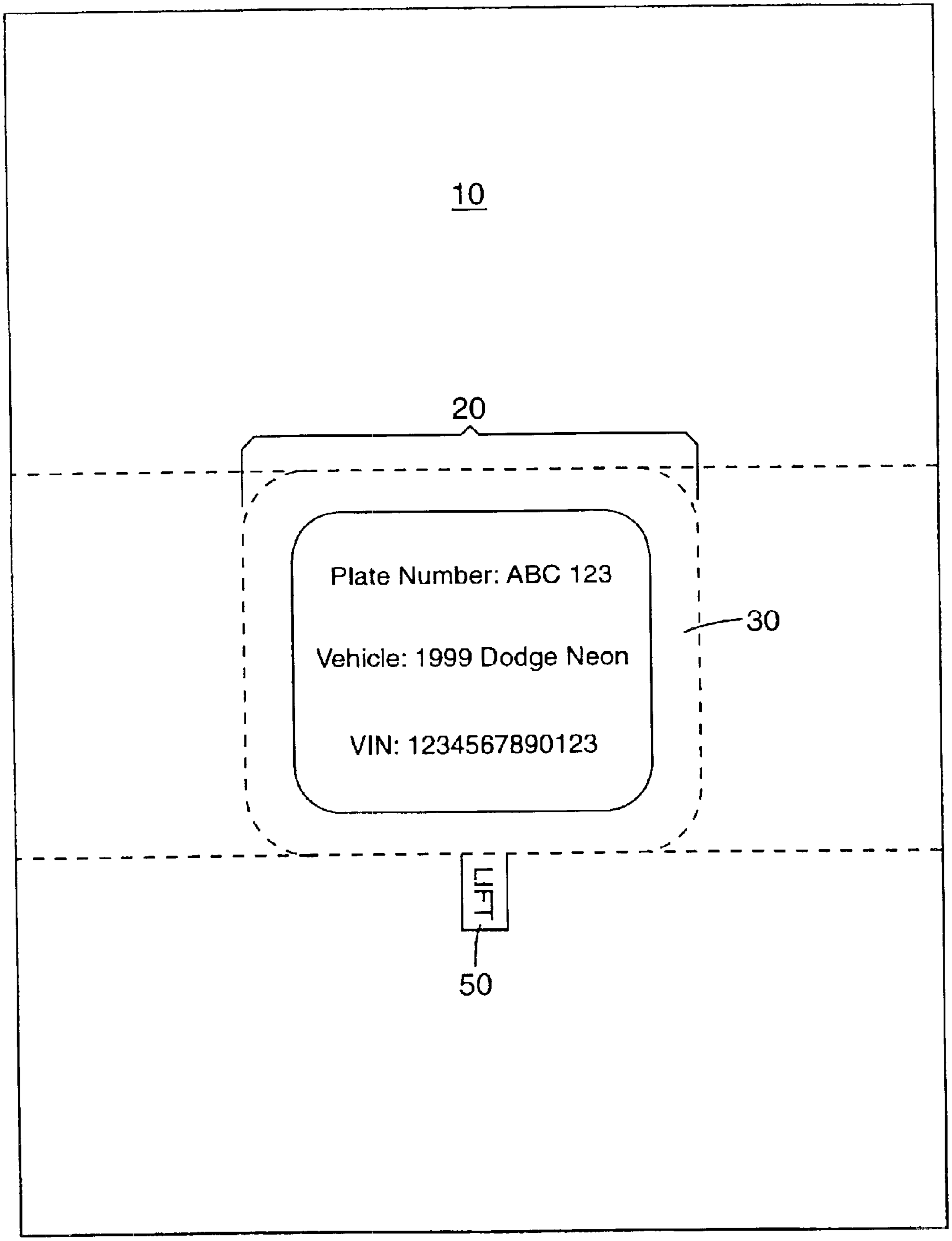

With reference to FIG. 4, during use sticker 20 including the form substrate portion bonded by means of adhesive 24 is separated from the remaining form substrate 10. Although the sticker could be cut out from the form with scissors for example, the sticker is typically separable from the form substrate by means of perforations along the perimerter of the sticker as depicted in FIGS. 5 and 6. The release liner 30 is removed and pressure sensitive adhesive 28 adhered to a target surface. In the case of FAV stickers, the target surface to which the sticker is adhered is positioned above, rather than beneath the sticker.

FIGS. 5 and 6 depict plan views of preferred form constructions of the present invention. The form substrate 10 preferably comprises an imprint and/or perforations 40 such that sticker 20 can be easily removed from the form by hand. Further, although sticker 20 may be preprinted with variable information, it is preferred that release liner 30 and the underlying transfer adhesive is provided only on a portion of the sticker face such that a portion of the sticker face is exposed. As depicted in FIG. 5, the release liner 30 having the underlying adhesive is provided in the shape of a frame with the center viewing surface of the sticker exposed. The exposed portion may then be concurrently printed along with the form.

As depicted in FIG. 6, for ease in removing the release liner 30 it is preferred that the release liner 30 comprises at least one tab 50. For embodiments wherein the release liner is scored into more than one piece, it is preferred that each release liner piece comprises a tab. For ease in printing it is preferred that the tab is positioned on the trailing back edge, rather than the front edge or side edge of the sticker, to minimize the tab causing printer interruptions. Other tab placement is also suitable provided the tab is adhered to the paper. The tab may comprise adhesive that remains adhered to the form upon removal of the sticker. Alternatively, a release coating may be applied to the form at the location of the tab, such that the tab is releasably adhered to the form. In another aspect, a tab may be post-applied to the release liner rather than being integral with the release liner.

Figure 7:
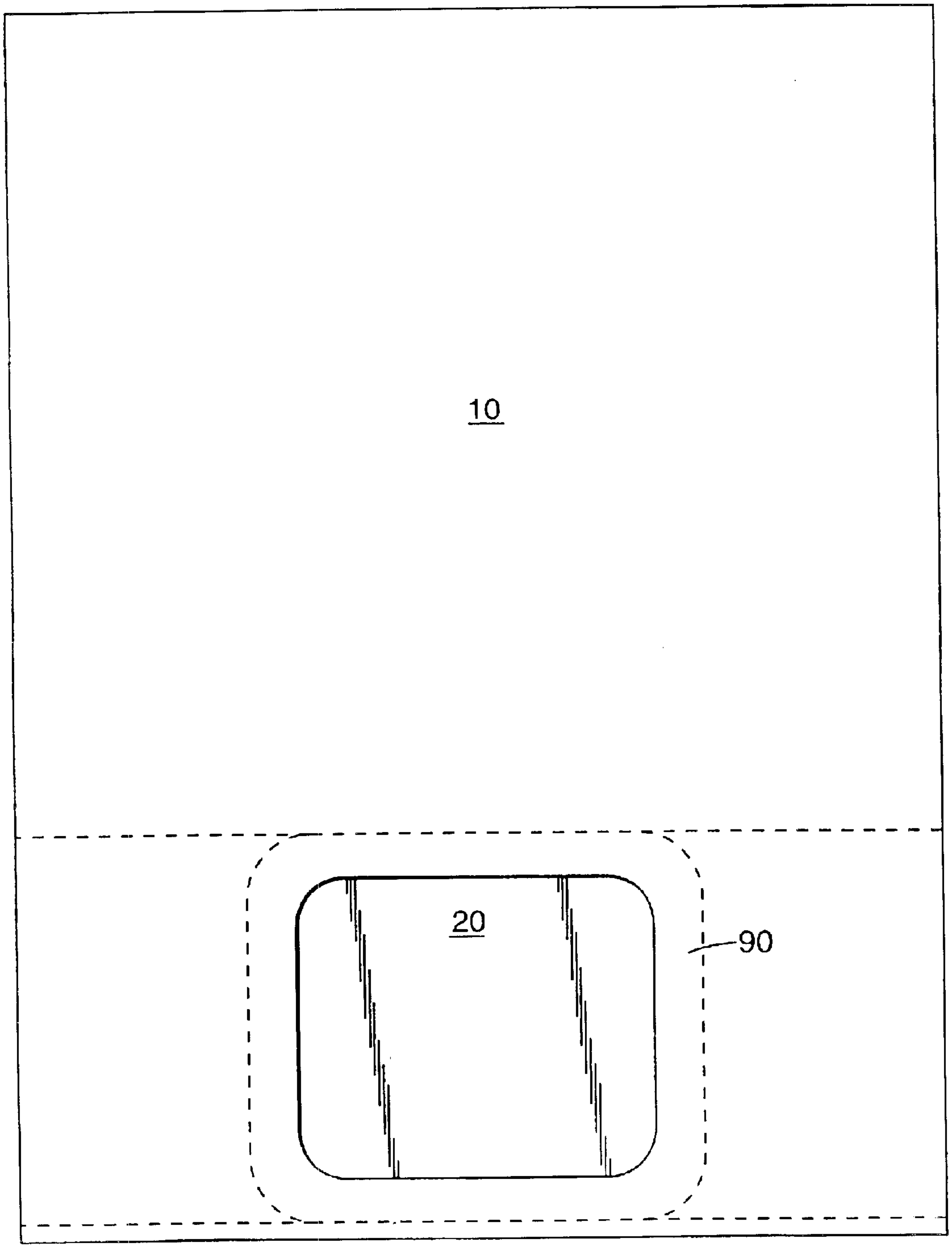
FIG. 7 depicts an embodied form construction that may comprise a FAV sticker or a conventional sticker.

As depicted in FIG. 7, the sticker may optionally be adhered to the non-viewing surface of the form construction, with at least a portion of the sticker visible through a cut out window 90 in the form substrate 10. In the case of FAV stickers, a single PSA is preferably present on the viewing surface, such adhesive being permanently bonded to the viewing surface of the sticker and releasably bonded to the perimeter of the window of the form substrate. The releasable bond may be accomplished by providing a release coating on the non-viewing surface of the form substrate, such as described in U.S. Pat. No. 6,406,787.

Alternatively, however, a conventional sticker may be employed in combination with a form construction having a cut out window wherein the viewing surface of the sticker is visible through the cut out. In a conventional sticker, the adhesive is present on the opposing surface of the sticker. For embodiments wherein the conventional sticker comprises a PSA, the opposing surface (i.e. backside) of the sticker would further comprise a release liner as well. Alternatively, for less durable sticker uses, the sticker may optionally comprise an adhesive composition that is activated by moistening the adhesive coated surface. The conventional sticker is temporarily bonded to the backside of the form along the perimeter of the sticker face. Various known removable adhesive compositions, also known as "tipping" adhesives are suitable for this use.

Although the form construction depicted in each of FIGS. 1–7 comprise a single sticker, the form construction may comprise multiple stickers as well. It is surmised that a preferred form construction would comprise a validation sticker such as described in U.S. Pat. No. 6,406,787 in combination with a FAV registration sticker.

Figure 1:
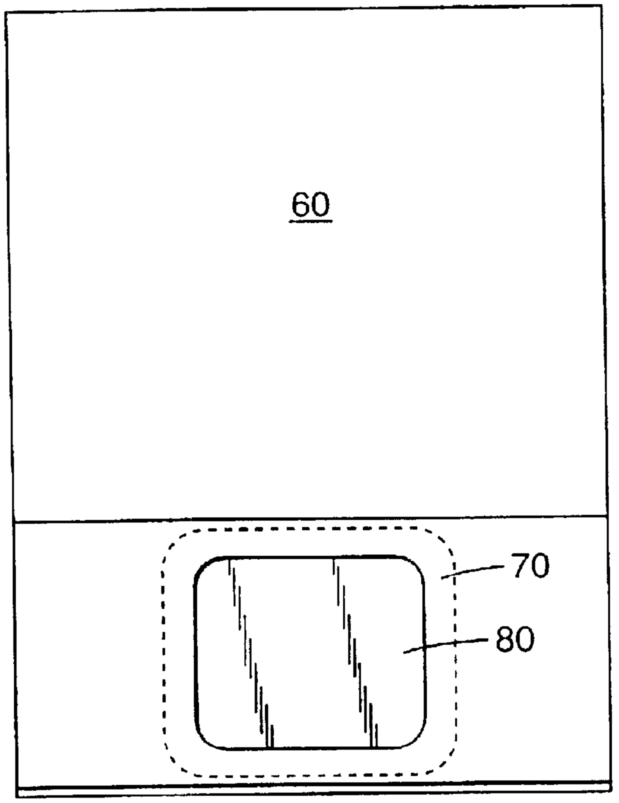
Fig. 1 PRIOR ART
FIG. 1 depicts a plan view of a prior art form construction comprising a sticker.
Figure 2:
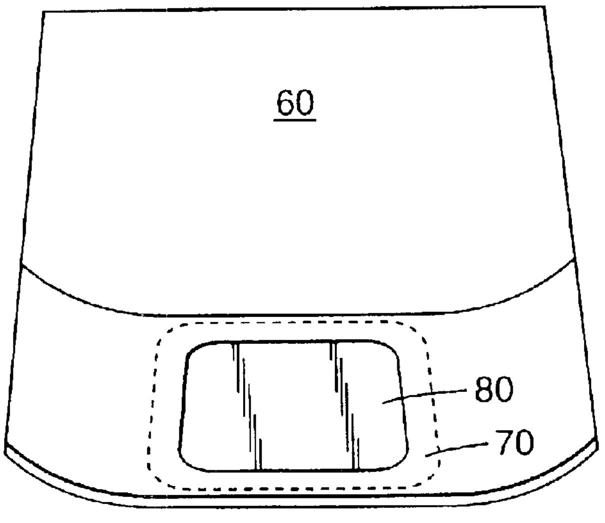
Fig. 2 PRIOR ART
FIG. 2 depicts a side view of the form construction of FIG. 1.

Rather than constructing the sticker on a form substrate, the method of the present invention entails providing a sticker and then adhering the sticker to the form substrate. This inventive form construction and method are advantageous in one aspect to reduce waste of the sticker materials and thus reduce the cost of the form. In another aspect, however, this method is advantageous for preventing curling of the form construction as depicted in FIG. 2.

The sticker has an adhesive on at least one surface for the purpose of adhering the sticker to a target surface. The adhesive is preferably a pressure sensitive adhesive (PSA) covered by a release liner. During the manufacture of the sticker, prior to bonding the sticker to the form substrate, the PSA of the sticker is typically transfer coated to the sticker substrate (e.g. viewing surface) by means of a release liner. The release liner typically comprises a paper or plastic film material having a release coating. Various release coating compositions are known such as those described U.S. Pat. No. 6,406,787. In preferred embodiments, only a portion of the sticker face comprises the adhesive and the remainder of the sticker face is exposed such that the sticker may be printed concurrently with printing the form. Alternatively, other non-PSA adhesive compositions may be used particularly for embodiments wherein the form substrate is porous (e.g. paper), the form substrate being exposed on the non-viewing surface of the sticker.

For the preferred FAV sticker construction, the sticker comprises such pressure sensitive adhesive covered with a release liner on the viewing surface. The pressure sensitive adhesive may be derived from a variety of known water-based, solvent-based, and 100% solids hot melt adhesive compositions. Preferred adhesive compositions are selected depending on the intended duration of use and expected exposure conditions of the sticker (e.g. temperature, humidity, sunlight). For example, removable adhesive compositions may be used for temporary uses (e.g. single day parking pass). For longer durations of intended use, it is preferred that the adhesive composition is initially repositionable, meaning that the sticker can be removed without damaging the sticker and reapplied, and then subsequently forms a permanent bond with the target surface (e.g. windshield). Although FAV stickers typically comprises transparent adhesive compositions, the adhesive composition may be translucent or opaque, and further colored, particularly if the adhesive is provided solely on a perimeter portion of the sticker. Particularly preferred adhesive compositions for FAV stickers intended for automobile windshields include adhesive commercially available from 3M under the trade designation "3M High Performance Adhesive 200MP".

Suitable pressure sensitive adhesives (PSAs) for use in the invention for bonding the sticker to the target surface (e.g. windshield) and optionally bonding the sticker to the form substrate are preferably repositionable at least temporarily or may be aggressive such that the sticker cannot be removed without damaging the sticker. In general, PSAs adhere to substrates without the need for more than hand pressure, and require no activation by water, solvent or heat. Suitable PSAs are disclosed, for example, in U.S. Pat. No. 5,725,935 (Signage Articles Methods of Making the Same), which is herein incorporated by reference.

PSAs suitable in the present invention are preferably selected from the group consisting of alkylacrylate polymers and copolymers; copolymers of alkylacrylates with acrylic acid; terpolymers of alkylacrylates, acrylic acid, and vinyl-lactates; alkyl vinyl ether polymers and copolymers; polyisoalkylenes; polyalkyldienes; alkyldiene-styrene copolymers; styrene-isoprene-styrene block copolymers; polydialkylsiloxanes; polyalkylphenylsiloxanes; natural rubbers; synthetic rubbers; chlorinated rubbers; latex crepe; rosin; cumarone resins; alkyd polymers; and polyacrylate esters and mixtures thereof. Examples include polyisobutylenes, polybutadienes, or butadiene-styrene copolymers, and mixtures thereof (such polymers and copolymers preferably have no reactive moieties, i.e., are not oxidized in the presence of air); silicone-based compounds such as polydimethylsiloxane, and polymethylphenylsiloxane combined with other resins and/or oils.

Other suitable PSAs also include tackified thermoplastic resins and tackified thermoplastic elastomers, wherein the tackifier comprises one or more compounds which increases the tack of the composition. An example of a tackified thermoplastic resin useful as an aggressively PSA is the combination of a vinyl acetate/ethylene copolymer known under the trade designation VYNATHENE EY 902-30 (available from Quantum Chemicals, Cincinnati, Ohio) with substantially equal portions of the tackifiers known under the trade designations PICCOTEX LC (a water-white thermoplastic resin produced by copolymerization of vinyltoluene and alpha-methylstyrene monomers having a ring and ball softening point of about 87°–95° C., available from Hercules Incorporated, Wilmington, Del.) and WINGTACK 10 (a liquid aliphatic C-5 petroleum hydrocarbon resin available from Goodyear Chemical) and an organic solvent such as toluene. An example of a tackified thermoplastic elastomer useful as an aggressively PSA is the combination of the styrene-poly(ethylene-butylene)-styrene block copolymer known under the trade designation KRATON G1657 (available from of Shell Chemicals) with one or more of the low molecular weight hydrocarbon resins known under the trade designation REGALREZ (from Hercules) and an organic solvent such as toluene. Both of these formulations may be coated using a knife coater and air-dried, or air-dried followed by oven drying. Of course, the invention is not limited to use of these specific combinations of thermoplastic resins, thermoplastic elastomers, and tackifiers.

Some presently preferred PSAs exhibit extended shelf life and resistance to detackifying under atmospheric conditions, and include acrylic-based copolymer adhesives as disclosed in U.S. Pat. No. Re 24,906. One example of such an acrylic-based copolymer is a 95.5:4.5 (measured in parts by weight of each) isooctylacrylate/acrylic acid copolymer. Another preferred adhesive is the copolymer of a 90:10 weight ratio combination of these two monomers. Yet other preferred adhesives are terpolymers of ethyl acrylate, butyl acrylate, and acrylic acid; copolymers of isooctylacrylate and acrylamide; and terpolyrmers of isooctylacrylate, vinyl-acetate, and acrylic acid.

Acrylic-based PSAs can be coated out of a coatable composition comprising an organic solvent, such as a heptane:isopropanol solvent mixture, and the solvent subsequently evaporated, leaving a pressure-sensitive adhesive coating. This layer is preferably from about 0.038 centimeters (cm) to about 0.11 cm (5 to 15 mils) thick when the substrate is a retroreflective sheeting material.

PSAs useful in the invention also may be characterized by having "180° peel adhesion" ranging from about 10 to about 1000 g/cm, more preferably at least about 50 g/cm. For aggressive PSAs the 180° peel adhesion typically ranges from about 200 g/cm to about 600 g/cm, measured using a standard test procedure. In this procedure, the force necessary to remove (i.e. peel) a PSA-coated substrate from a test substrate when the PSA-coated substrate is peeled from the test substrate is termed the "peel adhesion" value. A standard glass plate is cleaned using a solvent (such as one wash of diacetone alcohol followed by three washes of n-heptane). With very light tension, a sample having a PSA-backsize coating is then applied along the center of the standard glass plate, PSA side down. The sample is then rolled once with a 2.04 Kg hand roller. The standard glass plate is then secured to a horizontal platen in a standard peel adhesion tester such as that known under the trade name "IMASS." One end of the sample is then attached to a hook which is a part of the peel adhesion tester. The sample is peeled from the standard glass plate at a 180° angle (i.e., one end of the sample is pulled toward the other end) by moving the platen horizontally at a speed of 228.6 cm/min, and the force required recorded, in g/cm of sample width, for various dwell times.

Typically, the opposing surface (e.g. non-viewing) of the sticker also comprises an adhesive composition for the purpose of bonding the sticker to the form substrate. The adhesive on the opposing surface may be the same, yet typically is different than the adhesive present for the purpose of adhering the sticker to the target surface. For embodiments that employ a removable adhesive composition on the opposing surface such as a removable PSA or an adhesive composition wherein the bond diminishes under certain exposure conditions (e.g. when moistened), the adhesive on the opposing sticker surface nor the form substrate portion beneath the adhesive are necessarily present in the end-use sticker. For preferred embodiments that employ a non-removable PSA or other non-tacky (e.g. water-based) adhesive composition the form substrate becomes an integral part of the end-use sticker as depicted in FIGS. 3–6. Accordingly, the form substrate (e.g. paper) is exposed on the non-viewing surface of the sticker. Optionally, however, the backside of the form substrate may comprise a coating over the form substrate.

The sticker may optionally yet preferably comprise one or more tamper indicating features as are known in the art. Representative adhesion failure tamper indicating features are described in U.S. Pat. No. 5,153,042 (Indrelie); U.S. Pat. No. 5,770,283 (Gosselin et al.); and U.S. Pat. No. 4,999,076 (Faykish). Suitable delaminating film tamper indicating features are described in U.S. Pat. No. 4,876,123 (Rivera et al.); U.S. Pat. No. 6,395,376 (Cooley) and U.S. Pat. No. 6,416, 857 (Wright). An exemplary tamper indicating film is commercially available from 3M under the trade designation "3M 7380 Tamper Indicating Film".

During manufacture of the form construction, the sticker may be bonded to the form substrate such that the sticker and the form substrate have one common peripheral edge. Further, the sticker may be positioned in the corner of the form substrate sheet such that the sticker and the form substrate sheet have two common perpendicular peripheral edges. However, the sticker is sufficiently smaller than the form such that the sticker and the form substrate have uncommon parallel peripheral edges. Further, it is surmised most preferred, to position the sticker in a center portion of the form such that the peripheral edge area (i.e. within about 3 cm from the edges) of the form is substantially free of the sticker. By providing the sticker on the form construction in this manner, the form construction is substantially free of edge curling.

A preferred method of making the form construction entails providing a form substrate, removing the release liner from the opposing surface of a sticker exposing the underlying adhesive (e.g. PSA), and contacting the exposed adhesive to the substrate forming a bond. Accordingly the sticker is premanufactured prior to bonding the sticker to the form substrate or the sticker may be manufactured in-line. A preferred FAV sticker is premanufactured by providing a roll of retroreflective sheeting comprising a viewing surface and opposing surface having a PSA covered by a release liner and then bonding the viewing surface to a transfer tape having window-like openings spaced apart about 8.5 inches (21.6 cm) on center to the viewing surface of the sheeting followed by die kiss cutting through the sticker to the release liner from the viewing surface a frame of the desired size (e.g. 0.5 cm–5 cm) around the perimeter of each such window-like opening forming a sticker. The release liner of the retroreflective sheeting is then removed from each sticker and the stickers bonded to the bottom portion of a conveyed roll or sheet of paper such that the stickers are spaced apart 8.5 inches (21.6 cm) on center. For embodiment wherein the form substrate is provided in a roll, the roll is cut into sheets either before send the form to the end-user or at the site of printing the form, such that each sticker is positioned approximately in the center of each sheet as depicted in FIGS. 5 and 6.

At least a portion of the form substrate and preferably the entire form substrate is printable. Further, at least a portion of the sticker is preferably printable as well. "Printable" refers to sufficient anchorage of the printing composition (e.g. toner, ink) such that a graphic formed by the composition is readable. Preferably at least 50% of the printing composition is adhered to the printable surface portion. More preferably at least 70% and most preferably at least 90% of the printing composition is adhered to the printable surface portion. The form and/or sticker may be printed prior to applying the sticker to the form substrate. Preferably, however, the form is filled-in via printing and the sticker printed simultaneously with the same printing operation.

Although the form and/or the sticker may be printed using screen printing, letter press, offset, laser or thermal transfer printing technologies, the form and/or sticker are preferably digital printable. As used herein, "digital printable" refers to printable by a digital printing method including, laser, ink-jet, thermal mass transfer, thermal dye transfer, electrostatic, ion deposition, electron beam imaging, solid ink-jet and dot-matrix printings. It is most preferred to digital print by means of a laser printing, thermal mass transfer, or ink-jet printing.

The form substrate is preferably paper. However, the form substrate may comprise other porous or non-porous materials such as films, nonwovens, cardboard and woven fabric. For embodiments wherein the substrate is not sufficiently printable, the substrate may further comprise an ink-receptive coating on at least the printable surface portion. The form substrate as well as the form construction may be provided in a roll, typically including individual portions separated by perforation lines that can be separated into individual sheets. Preferably, the form substrate is provided in a roll during manufacture of the form construction with the finished form construction provided as individual sheets. Further, the form substrate preferred has an impression or perforations along the peripheral edge of the sticker such that the sticker can easily be removed from the surrounding form substrate.

Although the present invention is particularly useful for validation sticker forms, other form constructions that are not necessarily retroreflective may also be produced such as indoor/outdoor labeling products, product authentication articles, inventory labeling and control articles, window stickers and inspection stickers for automobiles and other equipment, parking permits, expiration stickers, park passes, advertisement mailers, decorative stickers etc.

The sticker substrate 26 typically comprises retroreflective sheeting that is often commercially available with pre-applied PSA layer 24 covered with a release liner. The two most common types of retroreflective sheeting suitable for use are microsphere-based sheeting and cube corner-based sheeting. Microsphere-based sheeting, sometimes referred to as "beaded sheeting," is well known to the art and includes a multitude of microspheres typically at least partially embedded in a binder layer, and associated specular or diffuse reflecting materials (such as metallic vapor or sputter coatings, metal flakes, or pigment particles). Illustrative examples of microsphere-based sheeting are disclosed in U.S. Pat. No. 4,025,159 (McGrath); U.S. Pat. No. 4,983,436 (Bailey); U.S. Pat. No. 5,064,272 (Bailey); U.S. Pat. No. 5,066,098 (Kult); U.S. Pat. No. 5,069,964 (Tolliver); and U.S. Pat. No. 5,262,225 (Wilson).

Cube corner sheeting, sometimes referred to as prismatic, microprismatic, or triple mirror reflector sheetings, typically includes a multitude of cube corner elements to retroreflect incident light. Cube corner retroreflectors typically include a sheet having a generally planar front surface and an array of cube corner elements protruding from the back surface. Cube corner reflecting elements include generally trihedral structures that have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially toward the light source. In the case of total internal reflection, the air interface must remain free of dirt, water and adhesive and therefore is enclosed by a sealing film. The light rays are typically reflected at the lateral faces due to total internal reflection, or by reflective coatings, as previously described, on the backside of the lateral faces. Preferred polymers for cube corner sheeting include poly (carbonate), poly(methylmethacrylate), poly (ethyleneterephthalate), aliphatic polyurethanes, as well as ethylene copolymers and ionomers thereof. Cube corner sheeting may be prepared by casting directly onto a film, such as described in U.S. Pat. No. 5,691,846 (Benson). Preferred polymers for radiation cured cube corners include cross linked acrylates such as multifunctional acrylates or epoxies and acrylated urethanes blended with mono-and multifunctional monomers. Further, cube corners such as those previously described may be cast on to plasticized polyvinyl chloride film for more flexible cast cube corner sheeting. These polymers are preferred for one or more reasons including thermal stability, environmental stability, clarity, excellent release from the tooling or mold, and capability of receiving a reflective coating.

In embodiments wherein the sheeting is likely to be exposed to moisture, the cube corner retroreflective elements are preferably covered with a seal film. In instances wherein cube corner sheeting is employed as the retroreflective layer, a backing layer may be present for the purpose of opacifying the laminate or article, improving the scratch and gouge resistance thereof, and/or eliminating the blocking tendencies of the seal film. Illustrative examples of cube corner-based retroreflective sheeting are disclosed in U.S. Pat. No. 5,138,488 (Szczech); U.S. Pat. No. 5,387,458 (Pavelka); U.S. Pat. No. 5,450,235 (Smith); U.S. Pat. No. 5,605,761 (Burns); U.S. Pat. No. 5,614,286 (Bacon) and U.S. Pat. No. 5,691,846 (Benson, Jr.).

The coefficient of retroreflection of the retroreflective stickers varies depending on the intended use. In general, however, the unprinted area of a uncolored (i.e. white or silver) retroreflective sticker typically has a coefficient of retroreflection ranging from about 5 to about 1500 candelas per lux per square meter at 0.2 degree observation angle and −4 degree entrance angle, as measured according to ASTM E-810 test method for coefficient retroreflection of retroreflective sheeting. The coefficient of retroreflection is preferably at least 10, more preferably at least 20, and even more preferably at least 50 candelas per lux per square meter. It is understood by those skilled in the art that the coefficient of retroreflection is lower for colored sheeting due to absorption and scattering.

Objects and advantages of the invention are further illustrated by the following examples, but the particular materials and amounts thereof recited in the examples, as well as other conditions and details, should not be construed to unduly limit the invention.

EXAMPLE 1

Preparation of a Sticker Form

A 2 inch (5 cm) wide by 4 inch (10 cm) long window (i.e., opening) was cut by hand using a razor blade from a 3.5 inch (9 cm) wide by about 5 inch (13 cm) long strip of laminating adhesive commercially available from 3M, under the trade designation "Scotch 9172MP Laminating Adhesive" (9172MP adhesive). The 9172MP adhesive comprises a laminating adhesive sandwiched between a release liner film and a paper release liner. The paper release liner was removed from the windowed 9172MP adhesive and the exposed adhesive was adhered to the viewing surface of a 4 inch (10 cm) wide by 12 inch (30 cm) long piece of sheeting similar in construction to that commercially available from 3M under the trade designation "3M Scotchlite Validation Security Sheeting Series 5330" (Scotchlite 5330 sheeting). The windowed 9172MP adhesive was laminated to the Scotchlite 5330 sheeting using a back and forth motion twice with a small hand roller. After the windowed 9172MP adhesive was laminated to the Scotchlite 5330 sheeting, a 3 inch (7.6 cm) wide by 5 inch (13 cm) long rectangle, the size of a finished window sticker, was cut out using a scissors such that the window was in the center of the sticker. The release liner was then removed from the Scotchlite 5330 sheeting and the exposed adhesive was applied to a 8.5 inch (21.6) by 11 inch (28 cm) sheet of 20 lb (75 grams per meter squared) bond paper commercially available from International Paper, Memphis, Tenn., under the trade designation "HammerMill Copy Plus." The exposed adhesive was laminated to the bond paper using a back and forth motion twice with a small hand roller. The sticker construction on the bond paper was then perforated using a small hand perforation tool along the outer edges of the resultant sticker on a sticker form. The sticker on the sticker form was printed with text using a Model No. ML 1651 N laser printer commercially available from Samsung Electronics Co., LTD, Korea. After the sticker form was printed, the sticker was removed from the sticker form along the perforations in the sticker form. The release liner from the 9172MP adhesive was removed by pulling the release liner backwards using a fingernail to expose the adhesive so that the sticker could be applied to a window.

EXAMPLE 2

Preparation of a Sticker Form with a Tamper Indicating Film

The paper release liner was removed from 9172MP adhesive and the exposed adhesive was adhered to the surface of a 3.5 inch (8.9 cm) wide by about 5 inch (12.5 cm) long strip of film commercially available from 3M under the trade designation "3M 7380 Tamper Indicating Film" (7380 film). The paper release liner from another piece of 9172 MP adhesive was adhered to the exposed surface of the previously adhered 7380 film. A 2 inch (5 cm) wide by 4 inch (10 cm) long window was cut by hand using a razor blade from the construction. The release liner was then removed from the Scotchlite 5330 sheeting and the exposed adhesive was laminated to the 8.5 inch (21.6 cm) by 11 inch (28 cm) sheet of paper of Example 1 using a back and forth motion twice with a small hand roller. The sticker construction on the bond paper was then perforated using a small hand perforation tool along the outer edges of the resultant sticker on a sticker form. The sticker on the sticker form was printed with text using a laser printer commercially available from Samsung Electronics Co., LTD, Korea under the trade designation "Model No. ML 1651 N". After the sticker form was printed, the sticker was removed from the sticker form along the perforations in the sticker form. The top surface release liner from the 9172 MP adhesive was removed by pulling the release liner backwards using a fingernail to expose the adhesive so that the sticker could be applied to a window.

When the sticker is applied to a window and subsequent removal attempted, the 7380 film would split and leave some indicator, such as the word "void", on the window and on the sticker face. This would alert officials that the sticker had been tampered with.

EXAMPLE 3

Preparation of a Sticker Form with Printed Tamper Indicating Feature

A sticker form was prepared as described in Example 2 with the following changes. Instead of using the 7380 film, a release solution commercially available from 3M under the trade designation "Scotch Y-110 Release Solution" (Y-110 solution) was applied on the viewing surface of the Scotchlite 5330 sheeting using a cotton tip applicator dipped into the solution and applied in stripes or lines by back and forth hand motion with the applicator. The release coating was allowed to air dry for about five minutes. Then a similar procedure, except using a flood coat application with the hand applicator, was used to apply a primer commercially available from 3M under the trade designation "Scotch Y-122 Primer Solution" atop the release coating. The primer was allowed to air dry for about 5 minutes, after which time, an ink commercially available from 3M under the trade designation "3M Scotchlite Process Color Ink Series 990-03 Blue" was flood coated atop the primer with the hand applicator. The resultant construction was dried in a 120° F. oven for one hour. The construction was removed from the oven and allowed to cool to room temperature. A 1 inch (2.5 cm) wide strip of tape commercially available from 3M under the trade designation "No. 610" was applied by hand to the ink surface of the construction and then securely adhered using hand pressure and the non-sharp edge of a single-edged razor blade to assure that the tape was securely adhered to the ink surface. The tape was then peeled from the ink surface by pulling the tape back by hand at a 90 degree angle relative to the surface of the ink. After removal of the No. 610 tape, the construction was visually inspected and it was observed that the ink was removed from the regions of the Scotchlite sheeting that had been coated with the Y-110 solution; whereas, the ink remained on the Scotchlite 5330 sheeting in the regions that had not been coated with the Y-110 solution. This showed that a printed tamper-indicating feature worked as an alternative to the 7380 film.

EXAMPLES 4 and 5

Preparation of a Sticker Form with a Liner Removal Tab

Two sticker forms were prepared as described in Examples 1 and 2, respectively, with the following changes. A 2 inch (5 cm) wide by 4 inch (10 cm) long window (i.e., opening) was cut by hand using a razor blade from a 3.5 inch (8.9 cm) wide by about 5 inch (13 cm) long strip of 9172MP adhesive. A 3 inch (7.6 cm) wide by 5 inch (13 cm) long rectangle, the size of a finished window sticker, and a tab about ½ inch (1.3 cm) by ½ inch (1.3 cm) was cut out using a scissors such that the 2 inch (4 cm) by 4 inch (10 cm) window was in the center of the sticker and the tab protruded from one edge. A 3 inch (7.6 cm) wide by 5 inch (12.7 cm) long sticker was cut from a 4 inch (10 cm) wide by 12 inch (30 cm) long piece of Scotchlite 5330 sheeting using a scissors. The paper liner was removed from the windowed and tabbed 9172MP adhesive; the exposed adhesive was adhered to the viewing surface of the 3 inch (7.6 cm) wide by 5 inch (12.7 cm) long piece of Scotchlite 5330 sheeting with the tab extending beyond the edge of the sticker using a back and forth motion twice with a small hand roller. An 8.5 inch (21 cm) by 11 inch (28 cm) sheet of the bond paper of Example 1 was coated with a release coating using a cotton tip applicator to coat an area on the surface of the paper about ¾ inch square. A suitable release coating is described in Example 2 of U.S. Pat. No. 6,406,787. The coating on the paper,was dried at room temperature for 15 minutes. The release liner was then removed from the Scotchlite 5330 sheeting and the exposed adhesive was applied to the 8.5 inch (21 cm) by 11 inch (28 cm) sheet of the paper such that the tab on the sticker was placed directly over the release coating on the paper. The paper form was then perforated and printed as described in Example 1. The tab was used to remove the release liner by pulling the tab backwards and exposing the adhesive. The sticker was then ready for application to a window.

EXAMPLE 6

Preparation of Cut-out Windowed Form with Conventional Sticker

A sticker form may be prepared by cutting a window in a sheet of paper, the window being spaced 8.5 inches (21 cm) on center, applying a removable adhesive to the perimeter of the paper along the window. A conventional sticker construction having a PSA covered by a release liner on the non-viewing surface can be releasably bonded to the removable adhesive of the form such that the center portion of the sticker is exposed through the cutout window. The sticker and form can then be printed by a digital printing process at the site of issuance. The sticker can then be removed from the form and applied to a target surface (e.g. license plate) via the adhesive.

EXAMPLE 7

Preparation of Cut-out Windowed Form with FAV Sticker

A sticker form may be prepared by cutting a window in a sheet of paper, the window being spaced 8.5 inches (21 cm) on center, applying a removable adhesive to the perimeter of the viewing surface of a sticker substrate forming a FAV sticker. Releasably bond the removable adhesive of the sticker to the perimeter of the cutout window such that the center portion of the sticker is exposed through the cutout window. The sticker and form can then be printed by a digital printing process at the site of issuance. The sticker can then be removed from the form and applied to a window via the face adhesive.

What is claimed is:

1. A form construction comprising a substrate having an exposed printable surface portion and a sticker having a viewing surface and an opposing surface, the viewing surface comprising a pressure sensitive adhesive covered with a release liner and the opposing surface comprising a pressure sensitive adhesive bonded to the exposed surface portion of the substrate, wherein the sticker and the substrate have uncommon parallel peripheral edges.

2. The form construction of claim 1 wherein the sticker is positioned in a center portion of the substrate.

3. The form construction of claim 2 wherein the pressure sensitive adhesive covered with the release liner of the viewing surface of the sticker has a peripheral edge that is substantially the same as the sticker.

4. The form construction of claim 3 wherein the sticker comprises at least one tab comprising the release liner.

5. The form construction of claim 2 wherein the pressure sensitive adhesive bonded to the substrate has a peripheral edge that is substantially the same as the sticker.

6. The form construction of claim 1 wherein the sticker has an exposed viewing surface portion.

7. The form construction of claim 6 wherein the viewing surface of the sticker comprises a frame of the pressure sensitive adhesive covered with the release liner.

8. The form construction of claim 1 wherein the sticker comprises a printable surface portion.

9. The form construction of claim 1 wherein the printable surface portion is digital printable by at least one of laser, ink-jet, thermal mass transfer, thermal dye transfer, electrostatic, ion deposition, electron beam imaging, solid ink-jet and dot-matrix printing.

10. The form construction of claim 8 wherein the printable surface portion is digital printable by at least one of laser, ink-jet, thermal mass transfer, thermal dye transfer, electrostatic, ion deposition, electron beam imaging, solid ink-jet and dot-matrix printing.

11. The form construction of claim 1 wherein the sticker comprises a polymeric film.

12. The form construction of claim 1 wherein the sticker is retroreflective.

13. The form construction of claim 1 wherein the sticker is selected from the group comprising a vehicle registration sticker, validation sticker, parking permit sticker, and park permit sticker.

14. The form construction of claim 1 wherein the sticker further comprises at least one tamper indicating feature.

15. The form construction of claim 1 wherein the substrate is a roll-good.

16. The form construction of claim 15 wherein the substrate comprises perforations such that the form can be separated into individual sheets.

17. The method of claim 1 wherein the substrate is a sheet.

18. A form construction comprising a porous substrate having an exposed printable surface portion and a sticker having a viewing surface and an opposing surface, the viewing surface comprising a pressure sensitive adhesive covered wit a release liner and the opposing surface comprises an adhesive bonded to the exposed printable surface portion of the porous substrate, wherein the porous substrate is exposed on the opposing surface of the sticker.

19. A form construction of using a form construction comprising providing the form construction of claim 1 and printing the substrate.

20. The form construction of claim 19 further comprising printing the sticker.

21. A method of making a form construction comprising:

providing a substrate having an exposed printable surface portion;

providing a sticker having a viewing surface and an opposing surface, both surfaces having a pressure sensitive adhesive covered wit a release liner;

removing the liner from the opposing surface exposing the adhesive; and contacting the exposed adhesive to the exposed printable surface of the substrate.

22. A form construction comprising:

a substrate having a printable surface portion and a cutout having a perimeter; and a sticker having a viewing surface and an opposing surface, at least one surface comprising an adhesive, wherein the viewing surface of the sticker is releasably attached to the perimeter of the cutout and exposed through the cutout.

23. The form construction of claim 22 wherein the viewing surface comprises a removable pressure sensitive adhesive.

24. The form construction of claim 22 wherein the viewing surface comprises a removable adhesive and the opposing surface comprises an adhesive suitable for bonding the sticker to a target surface.

* * * * *

UNITED STATES PATENT AND TRADEMARK OFFICE

CERTIFICATE OF CORRECTION

PATENT NO. : 6,869,654 B2
DATED : March 22, 2005
INVENTOR(S) : Ginkel, Scott T.

It is certified that error appears in the above-identified patent and that said Letters Patent is hereby corrected as shown below:

<u>Column 1,</u>
Line 31, delete "twith" and insert -- with --, therefor.

<u>Column 6,</u>
Line 30, delete "terpolyrmers" and insert -- terpolymers --, therefor.

<u>Column 12,</u>
Line 9, after "paper" delete ",".

<u>Column 14,</u>
Lines 2 and 17, delete "wit" and insert -- with --, therefor.

Signed and Sealed this

Twenty-fourth Day of May, 2005

JON W. DUDAS
*Director of the United States Patent and Trademark Office*